(12) United States Patent
Cook

(10) Patent No.: US 6,889,044 B1
(45) Date of Patent: May 3, 2005

(54) TONE-BASED REGISTRATION FOR A MOBILE USER OF A COMMUNICATIONS SYSTEM

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 432 days.

(21) Appl. No.: 09/636,232

(22) Filed: Aug. 10, 2000

(51) Int. Cl.$^7$ ................................................ H04Q 7/20
(52) U.S. Cl. ................ 455/435.1; 455/445; 455/456.3; 455/461; 379/355.01
(58) Field of Search ........................... 455/435.1, 445, 455/417, 456.3, 461, 415; 379/355.01, 201.01–201.04, 211.02, 355.03, 357.01–357.02, 357.05

(56) References Cited

U.S. PATENT DOCUMENTS

| | | | |
|---|---|---|---|
| 5,315,636 A | * | 5/1994 | Patel .......................... 455/445 |
| 5,610,972 A | * | 3/1997 | Emery et al. ................ 455/414 |
| 5,668,862 A | * | 9/1997 | Bannister et al. ........ 379/207.14 |
| 6,421,536 B1 | * | 7/2002 | Uranaka et al. ............. 455/417 |

* cited by examiner

*Primary Examiner*—William Trost
*Assistant Examiner*—Sharad Rampuria

(57) ABSTRACT

A user device and a control system operate to register a user with a communication system. The user device receives a user input requesting registration and transfers call tones to a telephone to initiate a telephone call. The control system answers the telephone call and transfers answer tones. The user device receives the answer tones and transfers user identification tones. The control system receives the user identification tones and a telephone number for the telephone. The control system processes the user identification tones and the telephone number to transfer acceptance tones over the telephone call and to transfer a route instruction to direct communications for the user to a communication device associated with the telephone number. The user device receives the acceptance tones and indicates successful registration to the user.

40 Claims, 6 Drawing Sheets

TONE-BASED REGISTRATION FOR A MOBILE USER OF A COMMUNICATIONS SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a communication system that uses a tone generator to automatically register a mobile user to use communication devices in the communications system.

2. Description of the Prior Art

A wireless communication system provides communications to a user despite the movement of the user within the system. In a wireless communication system, a mobile telephone exchanges wireless registration signals with a base station. The base station sends a registration message to a registration database. The wireless communication system then uses the registration database to forward calls to the base station that currently registers the mobile telephone. Unfortunately, this wireless communication system is complex and expensive.

Call-forwarding systems allow some user mobility without a complex wireless communication system. In a call-forwarding system, the user has calls that were placed to a first telephone number forwarded to a second telephone number. For example, the user may have calls that are placed to their office telephone number forwarded to their mobile telephone number. In another example, the user may have a personal telephone number that must be translated into a second telephone number for routing. The first number stays the same, but the user may change the second telephone number. To invoke call-forwarding, the user calls the call-forwarding system to identify themselves and provide the second telephone number. Unfortunately, the call-forwarding system forces the user to continually call in and manually register as they move about.

An auto-dialer is a device that emits a pre-defined series of tones to place a telephone call through a conventional telephone. The auto-dialer is typically used for access to a long distance provider or access to frequently called businesses, such as reservation agencies. Unfortunately, auto-dialers have not been configured to provide efficient user registration for the use of nearby communication devices.

SUMMARY OF THE INVENTION

The invention solves the above problems with a communication system and user device that allow a mobile user to automatically receive communications despite moving around within the system. The user device exchanges tones with a control system to register the user with the communication system, so the user may use proximately located communication devices. The communication system is less complex and expensive than wireless communication systems. The communication system does not require the user to continually call in and manually register.

In some examples of the invention, the user device receives a user input requesting registration and transfers call tones to a telephone to initiate a telephone call. The control system answers the telephone call and transfers answer tones. The user device receives the answer tones and transfers user identification tones. The control system receives the user identification tones and a telephone number for the telephone. The control system processes the user identification tones and the telephone number to transfer acceptance tones over the telephone call and to transfer a route instruction to direct communications for the user to a communication device associated with the telephone number. The user device receives the acceptance tones and indicates successful registration to the user.

BRIEF DESCRIPTION OF THE DRAWINGS

The same reference number represents the same element on all drawings.

DETAILED DESCRIPTION OF THE PREFERRED EMBODIMENT

Figure 1:
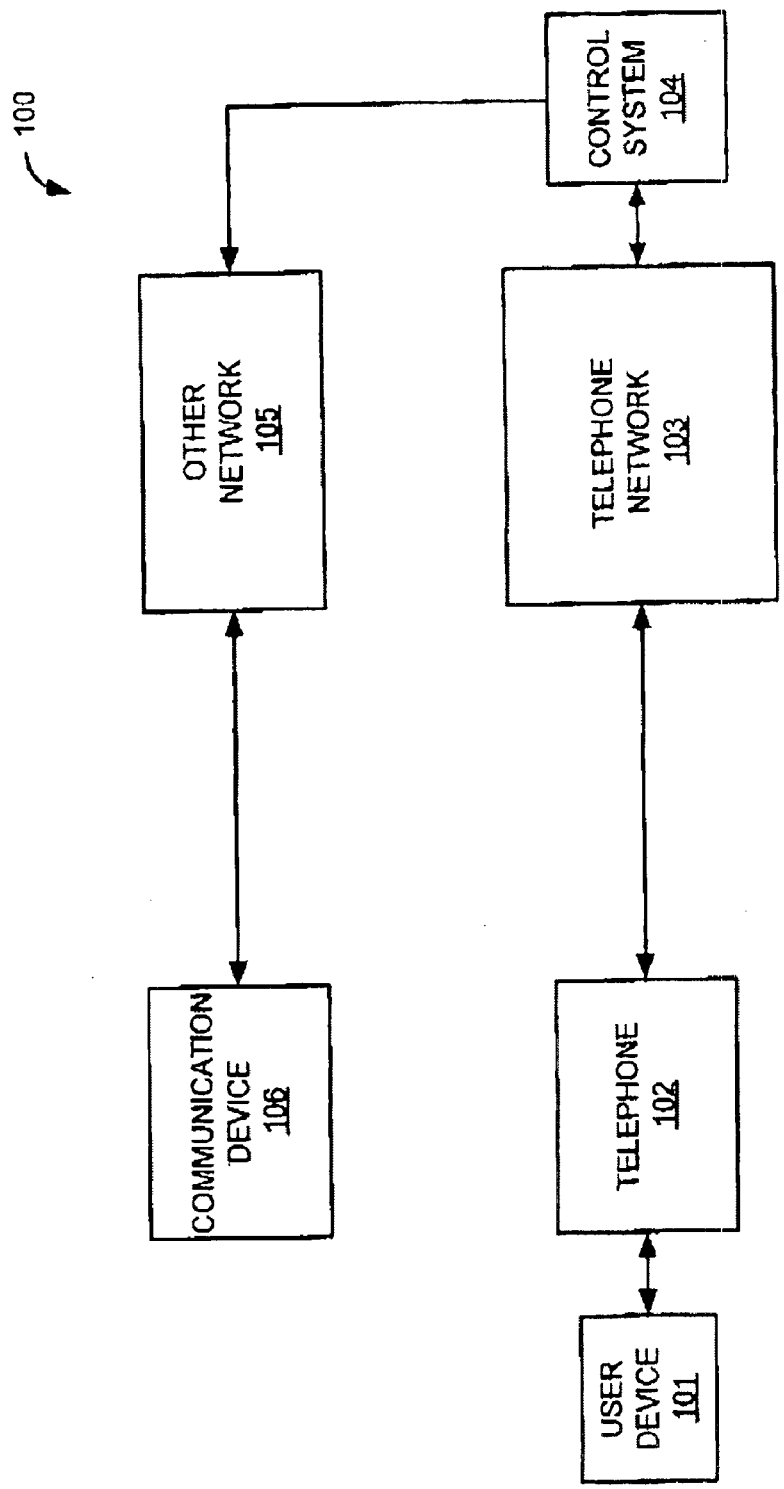
FIG. 1 is a block diagram that illustrates a communication system in an example of the invention.
Figure 2:
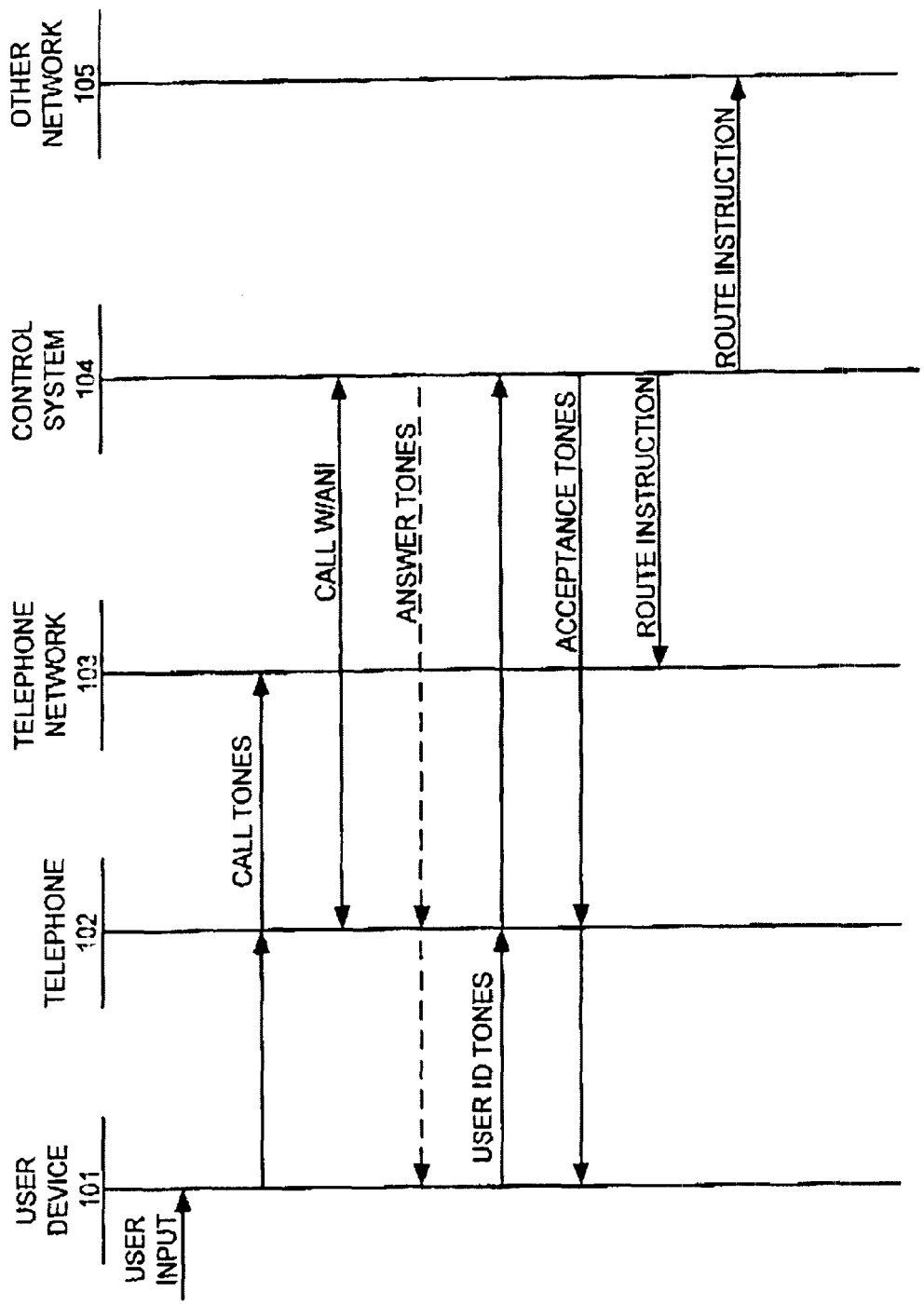
FIG. 2 is a message sequence chart that illustrates communication system operation in an example of the invention.
Figure 3:
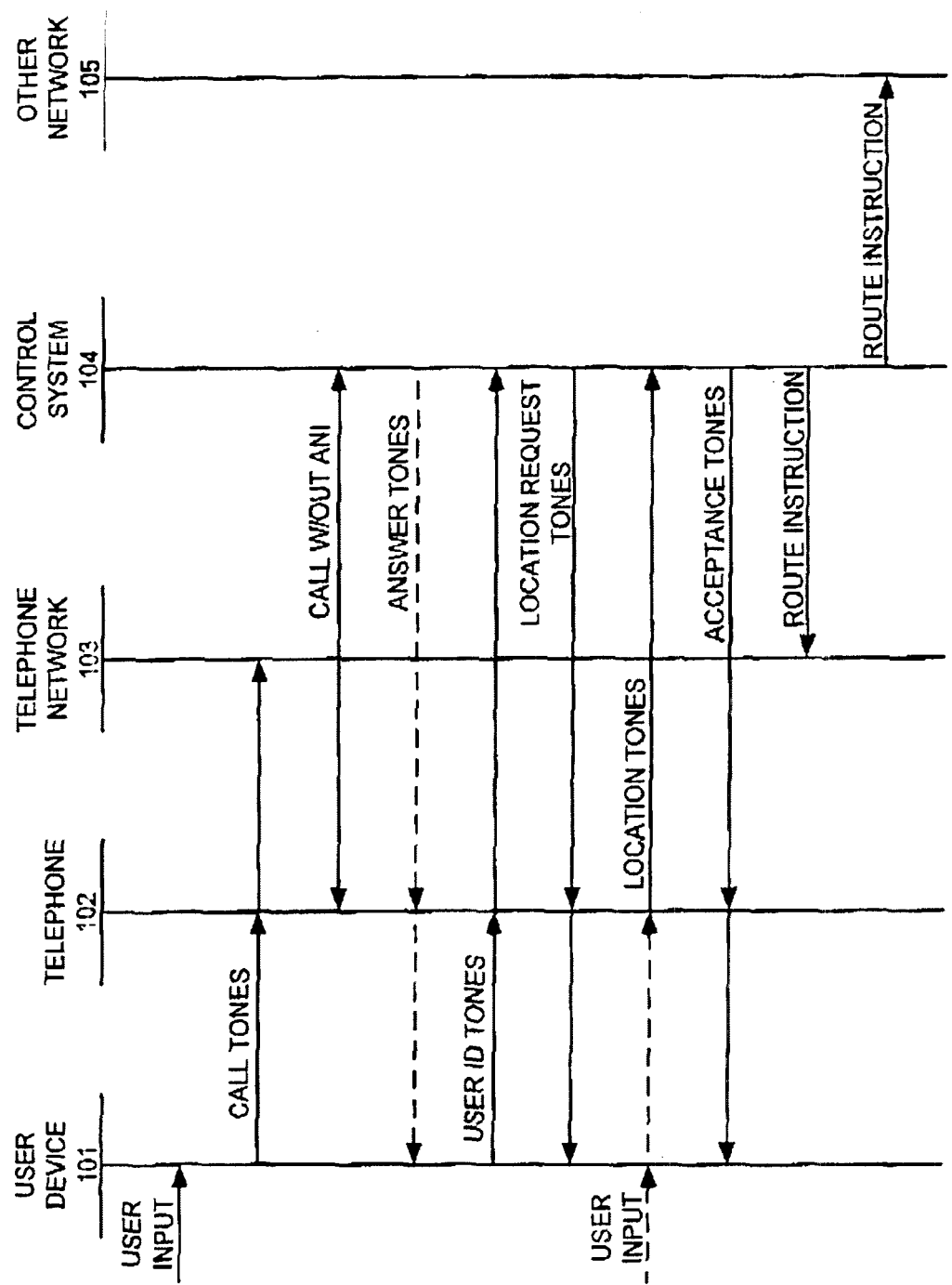
FIG. 3 is a message sequence chart that illustrates communication system operation in an example of the invention.

Communication System—FIGS. 1–3

FIGS. 1–3 depict a specific example of a communication system in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIGS. 1–3 have been simplified or omitted for clarity.

FIG. 1 is a block diagram that illustrates communication system 100 in an example of the invention. Communication system 100 comprises user device 101, telephone 102, telephone network 103, control system 104, other network 105, and communications device 106. Although not shown for clarity, other tone-operated telephones that are connected to telephone network 103 can be used in a similar manner to telephone 102. Thus, the user may register through any one of these ubiquitous telephones that are located throughout the United States, and as a result, have communications automatically re-directed to their current location.

User device 101 is typically a small low-power device that is convenient for the user to carry around. User device 101 could be a stand-alone device, or it could be integrated within a telephone, personal digital assistant, card, pager, global positioning device, or other similar device. User device 101 is discussed in further detail with respect to FIGS. 4–6.

Telephone 102 could be a conventional telephone or other device that provides a tone-based telephony interface to telephone network 103. Telephone network 103 could be the conventional Public Switched Telephone Network or some other type of tone-operated telephone system. Typically, the tones are dual tone multi-frequency signals. In the context of the invention, the term "tones" includes an individual tone.

Control system 104 is a computer platform with a telephony interface that is configured to operate as described below. Other network 105 could be a data network, video network, internet protocol network, or some other type of communication network. Communication device 166 could be a computer, video terminal, facsimile machine, LAN printer, network drive, or some other type of communication equipment.

FIG. 2 is a message sequence chart that illustrates the operation of communication system 100 in an example of the invention. On the message sequence charts, alternative or optional processing is indicated by dashed lines. User device 101 receives a user input requesting registration. In response to the user input, user device 101 automatically transfers call tones to telephone 102 to initiate a telephone call. The call tones represent a telephone number for control system 104. Telephone 102 transfers the call tones to telephone network 103, and based on the call tones, telephone network 103 establishes a telephone call between telephone 102 and control system 104. For this call, telephone network 103 provides Automatic Number Identification (ANI) to control system 104 to indicate the telephone number of telephone 102. The telephone number of telephone 102 represents a location indicator to correlate the user with telephone 102 and communication device 106.

Control system 104 answers the telephone call and responsively transfers answer tones over the telephone call. User device 101 receives the answer tones over the telephone call, and in response, automatically transfers user identification tones over the telephone call. The user identification tones represent a unique code that is associated with the user within control system 104. Control system 104 receives the user identification tones over the telephone call.

Instead of processing the answer tones, user device 101 may wait for a time period after sending the call tones and then send the user identification tones. The time period should be long enough for the call connection to be established. In this case, the answer tones may be ignored by user device 101 or omitted altogether.

Within control system 104, the telephone number from the ANI is associated with telephone 102 and communication device 106, which is typically located near telephone 102. Control system 104 processes the user identification tones and the telephone number to correlate the user with telephone 102 and communication device 106. Based on the correlation, control system 104 transfers acceptance tones over the telephone call. User device 101 receives the acceptance tones over the telephone call and responsively indicates a successful registration to the user. If desired, control system 104 could transfer an acceptance signal to communication device 106 based on the correlation. Communication device 106 receives the acceptance signal and responsively indicates a successful registration to the user.

Based on the correlation, control system 104 also transfers route instructions to telephone network 103 and other network 105. The route instructions cause networks 103 and 105 to direct communications for the user to the communication devices that are associated with the telephone number. For example, telephone network 103 routes telephone calls for the user to telephone 102 or to other nearby telephones. Other network 105 directs personalized web pages or video to communication device 106.

If desirable, control system 104 may be configured to instruct networks 103 and 105 to cease routing communications for the user to telephone 102 and communication device 106 after a period of time has elapsed since the last user registration. The user would then need to re-register using telephone 102 as described above. User device 101 could track the time period and indicate the need for re-registration to the user.

FIG. 3 is a message sequence chart that illustrates the operation of communication system 100 in an example of the invention where ANI is not available. User device 101 receives a user input requesting registration. In response to the user input, user device 101 automatically transfers call tones to telephone 102 to initiate a telephone call. The call tones represent a telephone number for control system 104. Telephone 102 transfers the call tones to telephone network 103, and based on the call tones, telephone network 103 establishes a telephone call between telephone 102 and control system 104. For this call, telephone network 103 does not provide ANI.

Control system 104 answers the telephone call and responsively transfers answer tones over the telephone call. User device 101 receives the answer tones over the telephone call, and in response, automatically transfers user identification tones over the telephone call. Control system 104 receives the user identification tones over the telephone call. The delay technique described above could be used instead of the answer tones.

If ANI is not available, then control system 104 transfers location request tones over the telephone call. User device 101 receives the location request tones, and in response, indicates to the user that input of a location indicator is required. The location indicator could be the telephone number for telephone 102, GPS coordinates, or some other code that correlates the user with telephone 102 or communication device 106. The user operates telephone 102 to output location tones that represent the location indicator, or the user operates user device 101, which outputs the location tones to telephone 102. Telephone 102 transfers the location tones over the telephone call, and control system 104 receives the location tones.

Control system 104 processes the user identification tones and the location tones to correlate the user with telephone 102 and communication device 106. Based on the correlation, control system 104 transfers acceptance tones over the telephone call. User device 101 receives the acceptance tones over the telephone call and responsively indicates a successful registration to the user. Communication device 106 may be used as described above to indicate successful registration.

Based on the correlation, control system 104 also transfers route instructions to telephone network 103 and other network 105. The route instructions cause networks 103 and 105 to direct communications for the user to the communication devices that are associated with the location indicator. For example, telephone network 103 routes telephone calls for the user to telephone 102 or to other nearby telephones. Other network 105 directs personalized web pages or video to communication device 106.

Figure 4:
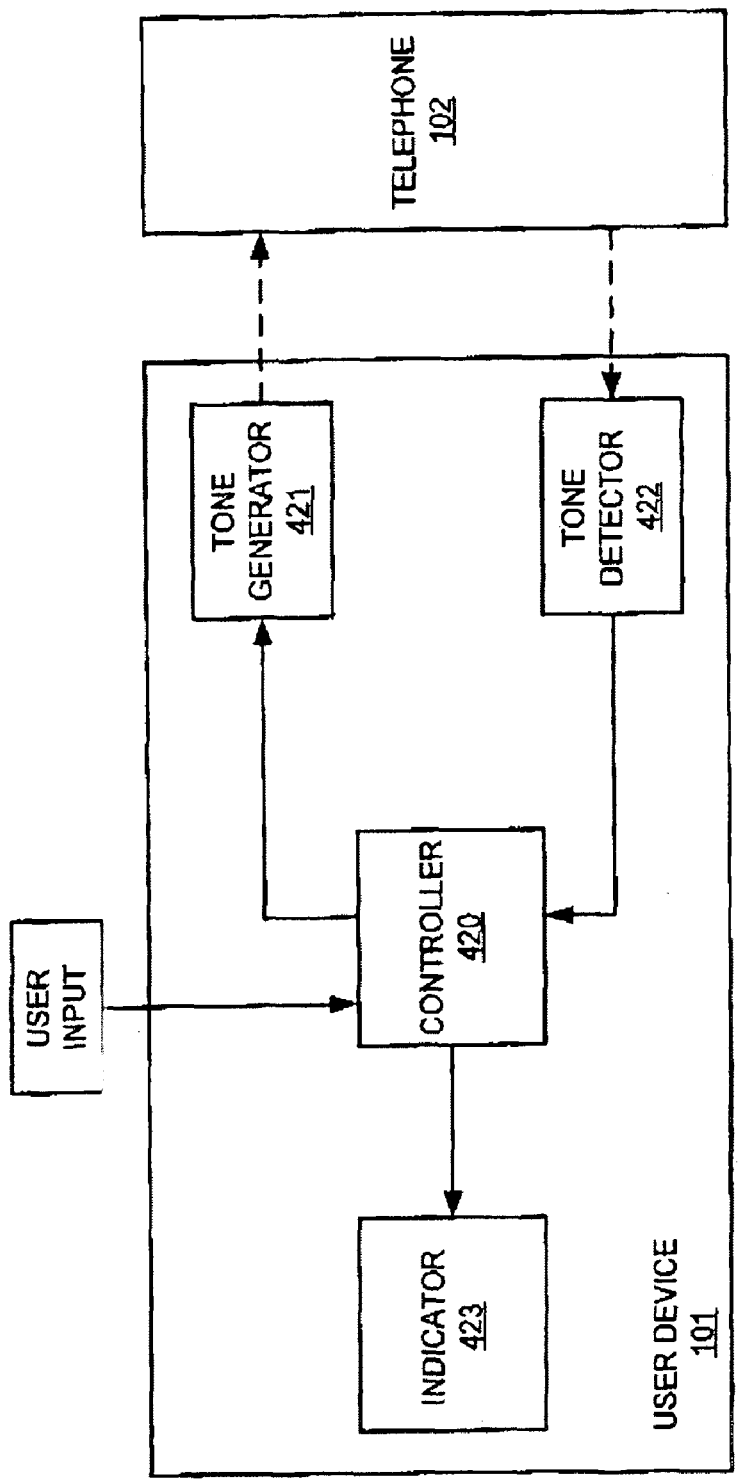
FIG. 4 is a block diagram that illustrates a user device in an example of the invention.
Figure 5:
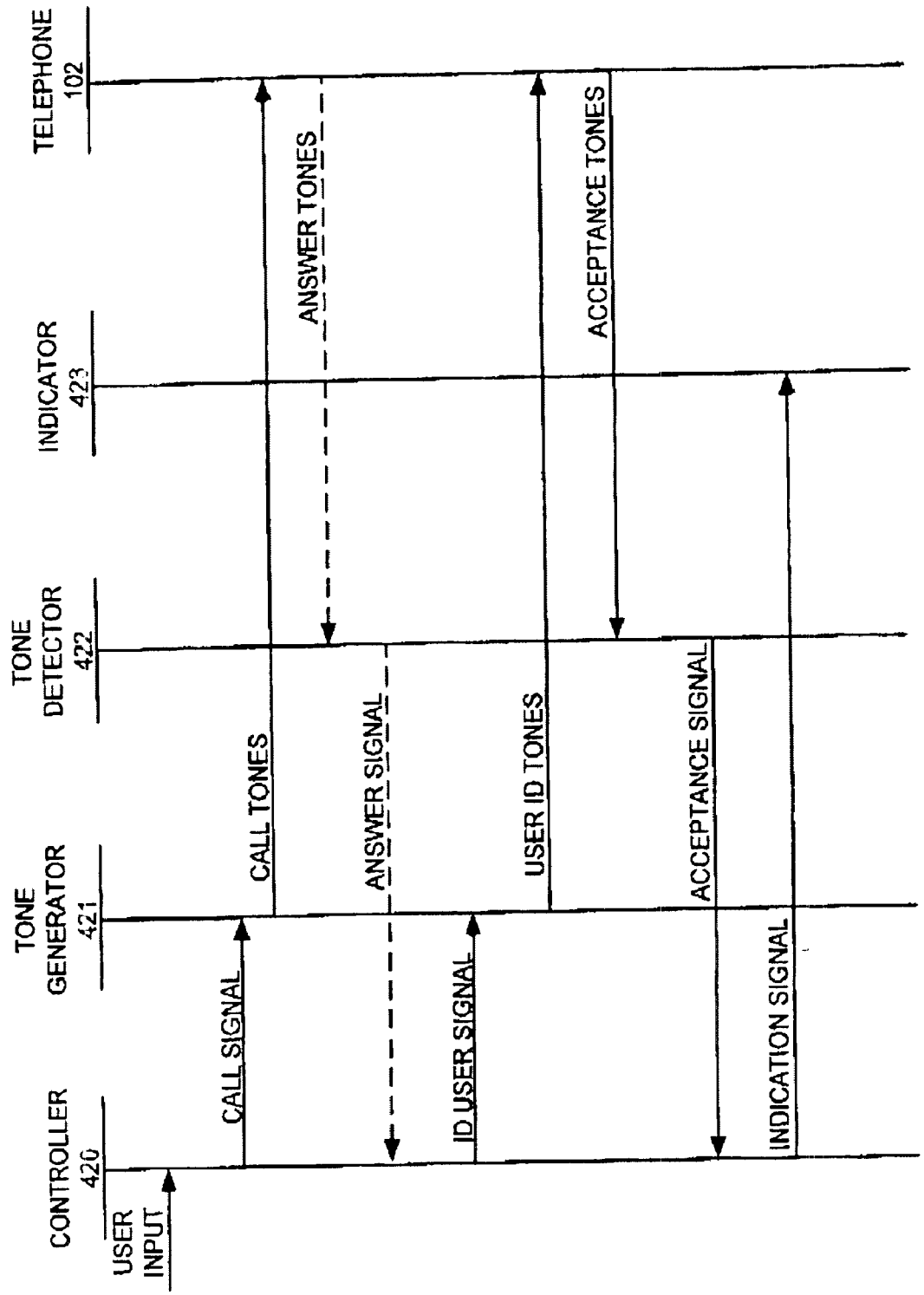
FIG. 5 is a message sequence chart that illustrates user device operation in an example of the invention.
Figure 6:
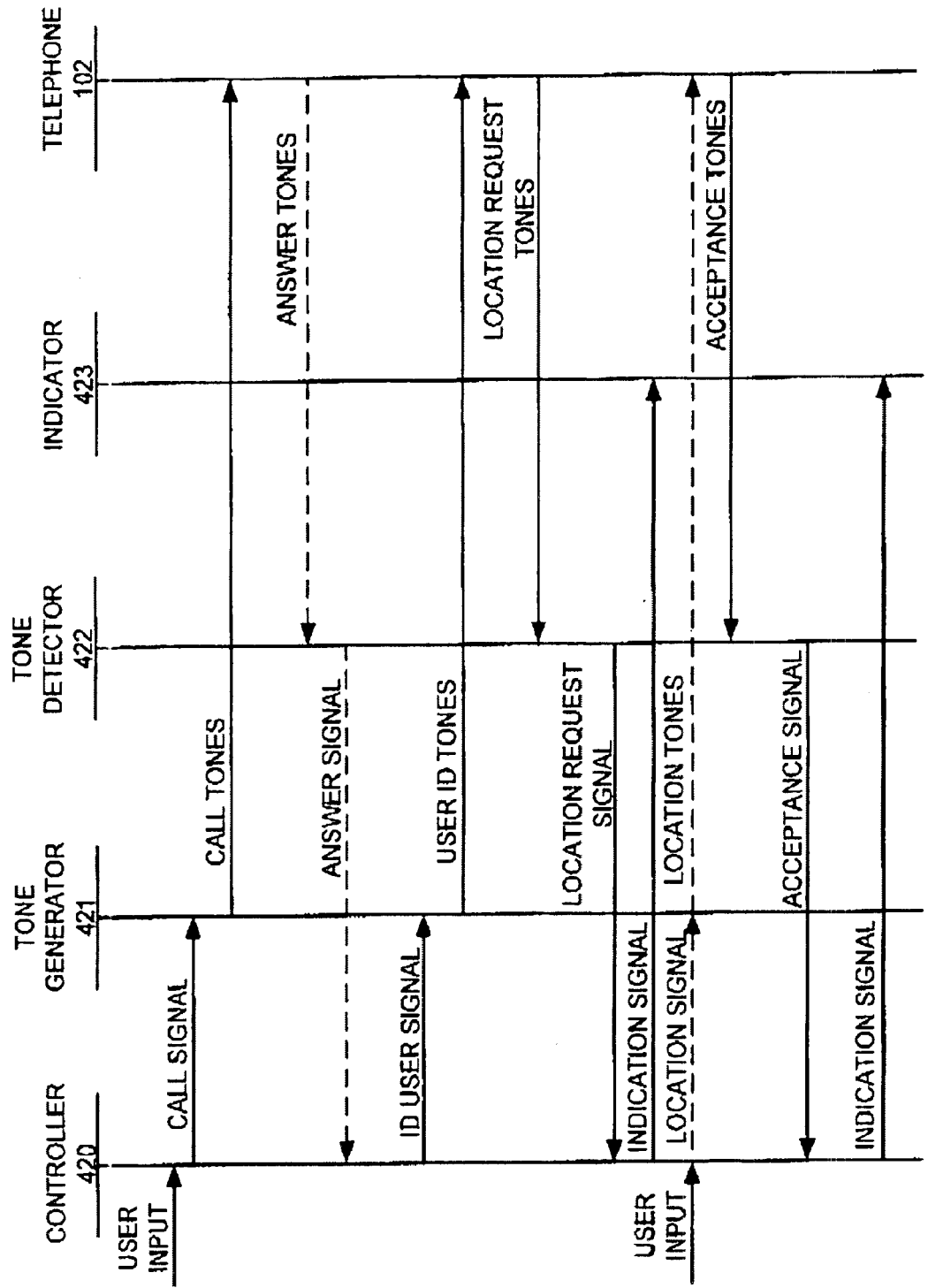
FIG. 6 is a message sequence chart that illustrates user device operation in an example of the invention.

User Registration Device—FIGS. 4–6

FIGS. 4–6 depict a specific example of a user device in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIGS. 4–6 have been simplified or omitted for clarity.

FIG. 4 is a block diagram that illustrates user device 101 in an example of the invention. User device 101 comprises controller 420 that is coupled to tone generator 421, tone detector 422, and indicator 423. Indicator 423 produces lights, sounds, displays, or some other form of communication to the user. User device 101 could be comprised of conventional circuitry configured to operate in accord with the invention.

FIG. 5 is a message sequence chart that illustrates user device 101 operation in an example of the invention. Before operation, the user first positions user device 101 in close enough proximity with telephone 102 to exchange tones. Controller 420 then receives the user input requesting registration, and in response, transfers a call signal to tone generator 421. Tone generator 421 receives the call signal, and in response, transfers call tones to telephone 102.

Tone detector 422 receives answer tones from telephone 102, and in response, transfers an answer signal to controller 420. Controller 420 receives the answer signal and in response, transfers a user identification signal to tone generator 421. Tone generator 421 receives the user identification signal, and in response, transfers user identification tones to telephone 102.

In the alternative to the answer tones discussed above, controller 420 waits for a time period after transferring the call signal and then transfers the user identification signal. The time period is long enough for the call to be established. Tone generator 421 receives the user identification signal, and in response, transfers user identification tones to telephone 102. Tone detector 422 ignores any answer tones.

If ANI is available, tone detector 422 then receives acceptance tones from telephone 102, and in response, transfers an acceptance signal to controller 420. Controller 420 receives the acceptance signal, and in response, transfers an indication signal to indicator 423. Indicator 423 receives the indication signal, and in response, indicates successful registration to the user.

FIG. 6 is a message sequence chart that illustrates user device 101 operation in an example of the invention where the user inputs the location indicator. Controller 420 receives the user registration input, and in response, transfers a call signal to tone generator 421. Tone generator 421 receives the call signal, and in response, transfers call tones to telephone 102.

Tone detector 422 receives answer tones from telephone 102, and in response, transfers an answer signal to controller 420. Controller 420 receives the answer signal and in response, transfers a user identification signal to tone generator 421. Tone generator 421 receives the user identification signal, and in response, transfers user identification tones to telephone 102. The delay technique may be used instead of the answer tones as described above.

Tone detector 422 receives location request tones from telephone 102, and in response, transfers a location request signal to controller 420. Controller 420 receives the location request signal, and in response, transfers a location request indication signal to indicator 423. Indicator 423 receives the location request indication signal, and in response, indicates to the user that input of the location indicator is required. The location indicator may be the telephone number for telephone 102.

The user then operates telephone 102 to input the location indicator, or the user may provide a user location input representing the location indicator to controller 420. In response to the user location input, controller 420 transfers a location signal representing the location indicator to tone generator 421. Tone generator 421 receives the location signal, and in response, transmits the location tones representing the location indicator to telephone 102.

Tone detector 422 receives acceptance tones from telephone 102, and in response, transfers an acceptance signal to controller 420. Controller 420 receives the acceptance signal, and in response, transfers an acceptance indication signal to indicator 423. Indicator 423 receives the acceptance indication signal, and in response, indicates successful registration to the user.

The above-described control system and controller may include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of registering a user with a communication system, the method comprising:

in a portable user device, receiving a user registration input;

in the portable user device, imitating a telephone call in the communication system by automatically transferring audible call tones from the portable user device to a telephone device in response to the user registration input;

in the portable user device, transferring audible user identification tones over the telephone call;

in a control system, answering the telephone call;

in the control system, receiving the audible user identification tones;

in the control system, receiving a location indicator;

in the control system, processing the audible user identification tones and the location indicator to generate a route instruction; and in the control system, transferring the route instruction to the communication system, wherein the route instruction routes telephone calls for the user to a communication device associated with the location indicator.

2. The method of claim 1 wherein transferring the audible user identification tones over the telephone call comprises:

in the control system, transferring answer tones over the telephone call in response to answering the telephone call; and in the portable user device, receiving the answer tones over the telephone call, and in response, automatically transferring the audible user identification tones from the portable user device and over the telephone call.

3. The method of claim 1 wherein transferring the audible user identification tones over the telephone call comprises waiting for a time period after transferring the audible call tones for the telephone call to be established and then transferring the audible user identification tones from the portable user device and over the telephone call.

4. The method of claim 1 wherein receiving the location indicator in the control system comprises receiving Automatic Number Identification (ANI) from a telephone network indicating a telephone number of the telephone device.

5. The method of claim 1 wherein receiving the location indicator in the control system comprises:
in the control system, transferring location request tones over the telephone call to the telephone device if Automatic Number Identification (ANI) is not available;
in the portable user device, receiving the location request tones from the telephone device, and in response, indicating to the user that input of the location indicator is required; and
in the control system, receiving location tones from the telephone device representing the location indicator.

6. The method of claim 5 further comprising, in the portable user device, receiving a user location input, and in response, transferring the location tones to the telephone device.

7. The method of claim 5 wherein the location indicator comprises a telephone number of the telephone device.

8. The method of claim 1 further comprising:
in the control system, processing the audible user identification tones and the location indicator to transfer acceptance tones over the telephone call; and
in the portable user device, receiving the acceptance tones over the telephone call, and in response, indicating successful registration to the user.

9. The method of claim 1 wherein the communication device comprises another telephone.

10. The method of claim 1 wherein the communication device comprises a computer.

11. The method of claim 1 wherein the communication device comprises a video terminal.

12. The method of claim 1 wherein the communication device comprises a facsimile machine.

13. The method of claim 1 wherein the communication device comprises a LAN printer.

14. The method of claim 1 wherein the communication device comprises a network drive.

15. A method of operating a portable user device to register a user with a communication system, the method comprising:
receiving a user registration input in a device controller of the portable user device;
in response to the user registration input, the device controller transferring a call signal to a tone generator of the portable user device and transferring a user identification signal to the tone generator;
receiving the call signal in the tone generator;
in response to the call signal, the tone generator automatically transferring audible call tones from the portable user device to a telephone device to initiate a telephone call;
receiving the user identification signal in the tone generator from the device controller,
in response to the user identification signal, the tone generator transferring audible user identification tones from the portable user device to the telephone device.

16. The method of claim 15 wherein transferring the user identification signal to the tone generator further comprises:
receiving answer tones in the tone detector, and in response, transferring an answer signal to the device controller; and
receiving the answer signal in the device controller, and in response, transferring the user identification signal to the tone generator.

17. The method of claim 15 further comprising:
receiving acceptance tones in the tone detector, and in response, transferring an acceptance signal to the device controller;
receiving the acceptance signal in the device controller, and in response, transferring an indication signal to an indicator of the portable user device; and
receiving the indication signal in the indicator, and in response, indicating successful registration to the user.

18. The method of claim 15 further comprising:
receiving location request tones in the tone detector, and in response, transferring a location request signal to the device controller;
receiving the location request signal in the device controller, and in response, transferring an indication signal to the indicator; and
receiving the indication signal in the indicator, and in response, indicating to the user that input of a location indicator is required.

19. The method of claim 18 wherein the location indicator comprises a telephone number of the telephone device.

20. The method of claim 18 further comprising:
receiving a location input representing the location indicator in the device controller, and in response, transferring a location signal to the tone generator;
receiving the location signal in the tone generator, and in response, transferring location tones representing the location indicator from the portable user device to the telephone device.

21. A communication system for registering a user, the communication system comprising:
a portable user device configured to receive a user registration input, automatically transfer audible call tones from the portable user device to a telephone device in response to the user registration input to initiate a telephone call in the communication system and to transfer audible user identification tones from the portable user device and over the telephone call; and
a control system configured to answer the telephone call from the portable user device, receive the audible user identification tones, receive a location indicator, and in response, process the audible user identification tones and the location indicator, generate a route instruction, and transfer the route instruction to the communication system, wherein the route instruction routes telephone calls for the user to a communication device associated with the location indicator.

22. The communication system of claim 21 wherein:
the control system is configured to transfer answer tones over the telephone call in response to answering the telephone call;
the portable user device is configured to receive the answer tones over the telephone call, and in response, automatically transfer the audible user identification tones from the portable user device and over the telephone call.

23. The communication system of claim 21 wherein the portable user device is configured to wait for a time period after transferring the audible call tones for the telephone call to be established and then transfer the audible user identification tones over the telephone call.

24. The communication system of claim 21 wherein the control system is configured to receive Automatic Number Identification (ANI) from a telephone network indicating a telephone number of the telephone device as the location indicator.

25. The communication system of claim 21 wherein:

the control system is configured to transfer location request tones over the telephone call if Automatic Number Identification (ANI) is not available, and to receive location tones from the telephone device representing the location indicator; and the portable user device is configured to receive the location request tones from the telephone device, and in response, indicate to the user that input of the location indicator is required.

26. The communication system of claim 25 wherein the portable user device is configured to receive a user location input from the user, and in response, transfer the location tones to the telephone device.

27. The communication system of claim 25 wherein the location indicator comprises a telephone number of the telephone device.

28. The communication system of claim 21 wherein:

the control system is configured to process the audible user identification tones and the location indicator to transfer acceptance tones over the telephone call; and the portable user device is configured to receive the acceptance tones over the telephone call, and in response, indicate successful registration to the user.

29. The communication system of claim 21 wherein the communication device comprises another telephone.

30. The communication system of claim 21 wherein the communication device comprises a computer.

31. The communication system of claim 21 wherein the communication device comprises a video terminal.

32. The communication system of claim 21 wherein the communication device comprises a facsimile machine.

33. The communication system of claim 21 wherein the communication device comprises a LAN printer.

34. The communication system of claim 21 wherein the communication device comprises a network drive.

35. A portable user device for registering a user with a communication system, the portable user device comprising:

a device controller configured to receive a user registration input, and in response, transfer a call signal and transfer a user identification signal; and a tone generator configured to receive the call signal, and in response, automatically transfer audible call tones from the portable user device to a telephone device to initiate a telephone call in the communication system, to receive the user identification signal from the device controller, and in response, transfer audible user identification tones from the portable user device to the telephone device and over the telephone call.

36. The portable user device of claim 35 wherein:

the tone detector is configured to receive answer tones from the telephone device, and in response, transfer an answer signal to the device controller; and the device controller is configured to receive the answer signal, and in response, transfer the user identification signal to the tone generator.

37. The portable user device of claim 35 wherein:

the tone detector is configured to receive acceptance tones from the telephone device, and in response, transfer an acceptance signal to the device controller;

the device controller is configured to receive the acceptance signal, and in response, transfer an indication signal; and further comprising an indicator configured to receive the indication signal, and in response, indicate successful registration to the user.

38. The portable user device of claim 35 wherein:

the tone detector is configured to receive location request tones, and in response, transfer a location request signal to the device controller;

the device controller is configured to receive the location request signal, and in response, transfer an indication signal; and further comprising an indicator configured to receive the indication signal, and in response, indicate to the user that input of a location indicator is required.

39. The portable user device of claim 38 wherein the location indicator comprises a telephone number of the telephone device.

40. The portable user device of claim 38 wherein:

the device controller is configured to receive a user location input representing the location indicator, and in response, transfer a location signal to the tone generator;

the tone generator is configured to receive the location signal, and in response, transfer location tones representing the location indicator from the portable user device to the telephone device.

* * * * *